United States Patent
Cola-Robles et al.

(10) Patent No.: US 9,244,712 B2
(45) Date of Patent: *Jan. 26, 2016

(54) VIRTUALIZING PERFORMANCE COUNTERS

(71) Applicant: Intel Corporation, Santa Clara, CA (US)

(72) Inventors: Erik C. Cola-Robles, Mountain View, CA (US); Gilbert Neiger, Portland, OR (US); Steven M. Bennett, Hillsboro, OR (US); Andrew V. Anderson, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 14/060,947

(22) Filed: Oct. 23, 2013

(65) Prior Publication Data

US 2014/0053155 A1    Feb. 20, 2014

Related U.S. Application Data

(63) Continuation of application No. 11/501,632, filed on Aug. 8, 2006, now Pat. No. 8,607,228.

(51) Int. Cl.
*G06F 9/455* (2006.01)
*G06F 9/46* (2006.01)
*G06F 11/34* (2006.01)

(52) U.S. Cl.
CPC ............ *G06F 9/45533* (2013.01); *G06F 9/455* (2013.01); *G06F 9/45558* (2013.01); *G06F 9/46* (2013.01); *G06F 9/461* (2013.01); *G06F 9/462* (2013.01); *G06F 9/468* (2013.01); *G06F 11/3466* (2013.01);

(Continued)

(58) Field of Classification Search
None
See application file for complete search history.

(56) References Cited

U.S. PATENT DOCUMENTS 274,090 A    4/1956    Goss et al.
341,757 A    12/1968   Stucky et al.
(Continued)

FOREIGN PATENT DOCUMENTS

CN    1659518 A    8/2005
EP    1331564 A1   7/2003
(Continued)

OTHER PUBLICATIONS

Japanese Patent Office, Final Notice of Reasons for Rejection mailed Jun. 5, 2012 in Japanese application No. 2009-523936.
(Continued)

*Primary Examiner* — Charles Swift
(74) *Attorney, Agent, or Firm* — Lowenstein Sandler LLP

(57) ABSTRACT

Embodiments of apparatuses, methods, and systems for virtualizing performance counters are disclosed. In one embodiment, an apparatus includes a counter, a counter enable storage location, counter enable logic, and virtual machine control logic. The counter enable storage location is to store a counter enable indicator. The counter enable logic is to enable the counter based on the counter enable indicator. The virtual machine control logic is to transfer control of the apparatus to a guest. The virtual machine control logic includes guest state load logic to cause a guest value from a virtual machine control structure to be loaded into the counter enable storage location in connection with a transfer of control of the apparatus to the guest.

26 Claims, 5 Drawing Sheets

(52) U.S. Cl.
CPC ............... *G06F 2009/45591* (2013.01); *G06F 2201/815* (2013.01); *G06F 2201/86* (2013.01); *G06F 2201/88* (2013.01)

(56) References Cited

U.S. PATENT DOCUMENTS

| | | | |
|---|---|---|---|
| 4,225,059 | A | 9/1980 | Kappos |
| 4,280,330 | A | 7/1981 | Harris et al. |
| 4,384,663 | A | 5/1983 | Smith-Williams |
| 4,496,016 | A | 1/1985 | Unsworth et al. |
| 4,975,836 | A | 12/1990 | Hirosawa |
| 5,307,645 | A | 5/1994 | Pannell |
| 5,584,188 | A | 12/1996 | Tippmann et al. |
| 6,619,065 | B1 | 9/2003 | Burton et al. |
| 7,069,413 | B1 | 6/2006 | Agesen |
| 7,392,370 | B2 | 6/2008 | DeWitt |
| 7,406,834 | B2 | 8/2008 | Williams |
| 7,788,664 | B1 | 8/2010 | Janakiraman |
| 2003/0037089 | A1 | 2/2003 | Cota-Robles |
| 2003/0217250 | A1 | 11/2003 | Bennett |
| 2004/0123228 | A1 | 6/2004 | Kikuchi et al. |
| 2004/0123288 | A1 | 6/2004 | Bennett |
| 2005/0033766 | A1 | 2/2005 | Pang |
| 2005/0076186 | A1 | 4/2005 | Traut |
| 2005/0166039 | A1 | 7/2005 | Wang |
| 2005/0183065 | A1 | 8/2005 | Wolczko |
| 2005/0223199 | A1 | 10/2005 | Grochowski |
| 2006/0136653 | A1 | 6/2006 | Traut et al. |
| 2007/0083643 | A1 | 4/2007 | Arndt |
| 2008/0270770 | A1 | 10/2008 | Vertes |
| 2011/0093750 | A1 | 4/2011 | Williams et al. |
| 2011/0107328 | A1 | 5/2011 | Serebrin et al. |

FOREIGN PATENT DOCUMENTS

| | | |
|---|---|---|
| JP | S63-020549 A | 1/1988 |
| JP | S63-301334 A | 8/1988 |
| JP | 03-269640 | 12/1991 |
| JP | 03-269640 A | 12/1991 |
| JP | 2004-318538 A | 11/2004 |
| KR | 10-2006-071307 A | 6/2006 |
| WO | 03/062989 A1 | 7/2003 |
| WO | 03/090070 A2 | 10/2003 |
| WO | 2006/039202 A2 | 4/2006 |
| WO | 2008/021794 A1 | 2/2008 |

OTHER PUBLICATIONS

IBM and Motorola, "PowerPC 604e, RISC Microprocessor User's Manual," Mar. 1998, pp. 9-1 to 9-15.
Chinese Patent Office, Office Action mailed Apr. 25, 2012 in Chinese application No. 200780025942.3.
Office Action Received for Taiwanese Patent Application No. 96129034, mailed on Oct. 4, 2011, 7 pages of Taiwanese Office Action and 9 pages of English Translation.
Office Action Received for Japanese Patent Application No. 2009-523936, mailed on Dec. 13, 2011, 3 pages of Japanese Office Action and 3 pages of English Translation.
"IA-32 Intel Architecture Software Developers Manual vol. 2: System Programming Guide", Japan, Intel Corporation, 2004, pp. 15-23, 15-25 to 15-33.
Office Action Received for Chinese Patent Application No. 200780025942.3, mailed on Jun. 22, 2011, 11 pages of Chinese Office Action including 5 pages of English Translation.
Office Action Received for Chinese Patent Application No. 200780025942.3, mailed on May 10, 2010, 6 pages of Office Action and 8 pages of English Translation.
Office Action Received for German Patent Application No. 11 2007 001 714.7-53, mailed on May 14, 2010, 8 Pages of Office Action including English Translation.
International Preliminary Report on Patentability and Written Opinion received for PCT Application No. PCT/US2007/075286, mailed on Feb. 19, 2009 , 8 Pages.
International Search Report and Written Opinion received for PCT Patent Application No. PCT/US2007/075286, mailed on Dec. 28, 2007, 11 Pages.
Office Action received for Chinese Patent Application No. 2007800259423, mailed on Nov. 28, 2012, 3 pages of Office Action and 3 pages of English Translation.
Office Action received for Japanese Patent Application No. 2009-523936, mailed on Oct. 9, 2012, 1 pages of Japanese Office Action and 3 pages of English Translation.
Notice of Allowance received for Japanese Patent Application No. 2013-022629, mailed on May 27, 2014, 1 pages of Japanese NOA only (No English Translation Available).
Office Action received for Japanese Patent Application No. 2013-022629, mailed on Feb. 18, 2014, 3 pages of English Translation and 3 pages of Japanese Office Action.

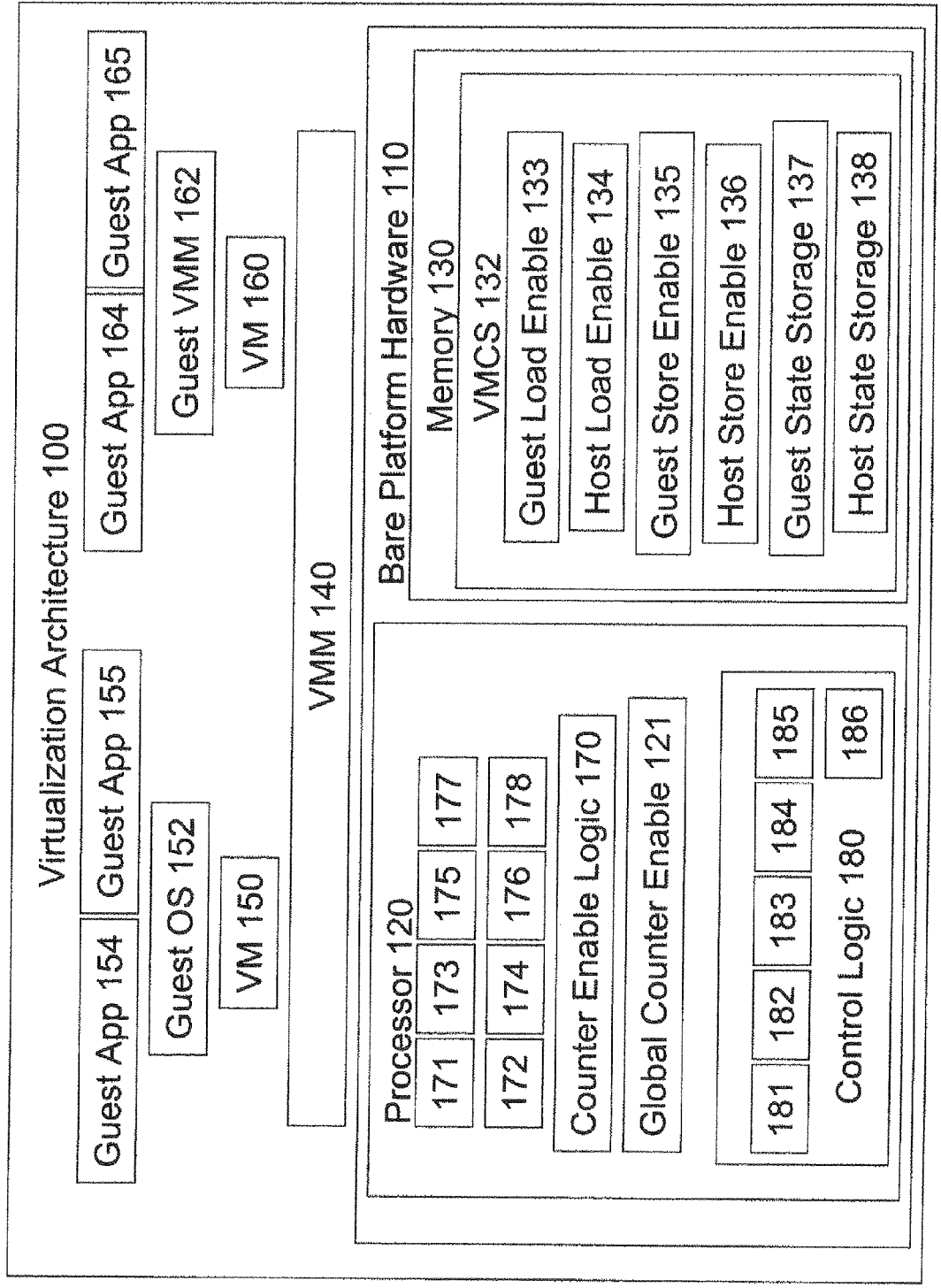

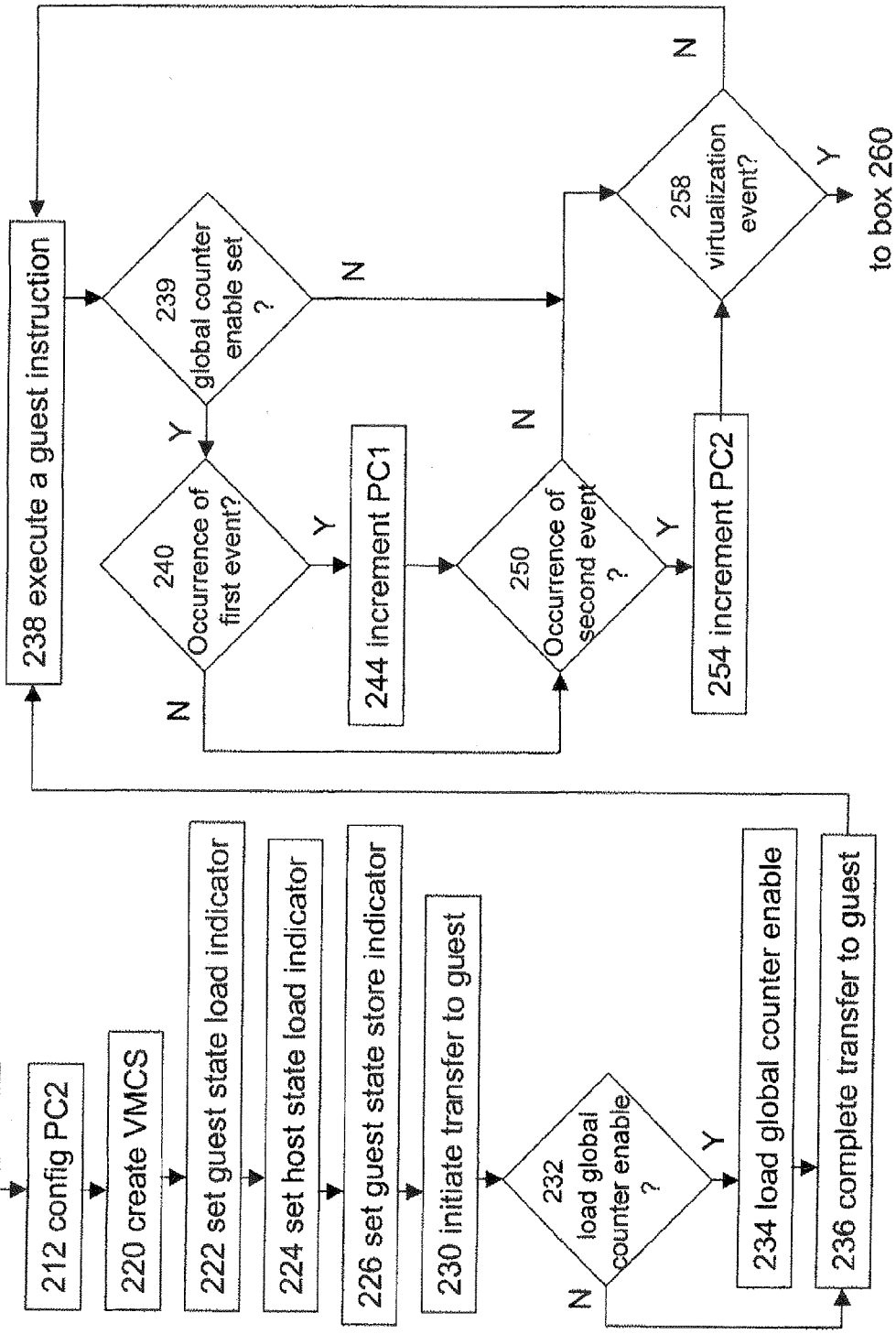

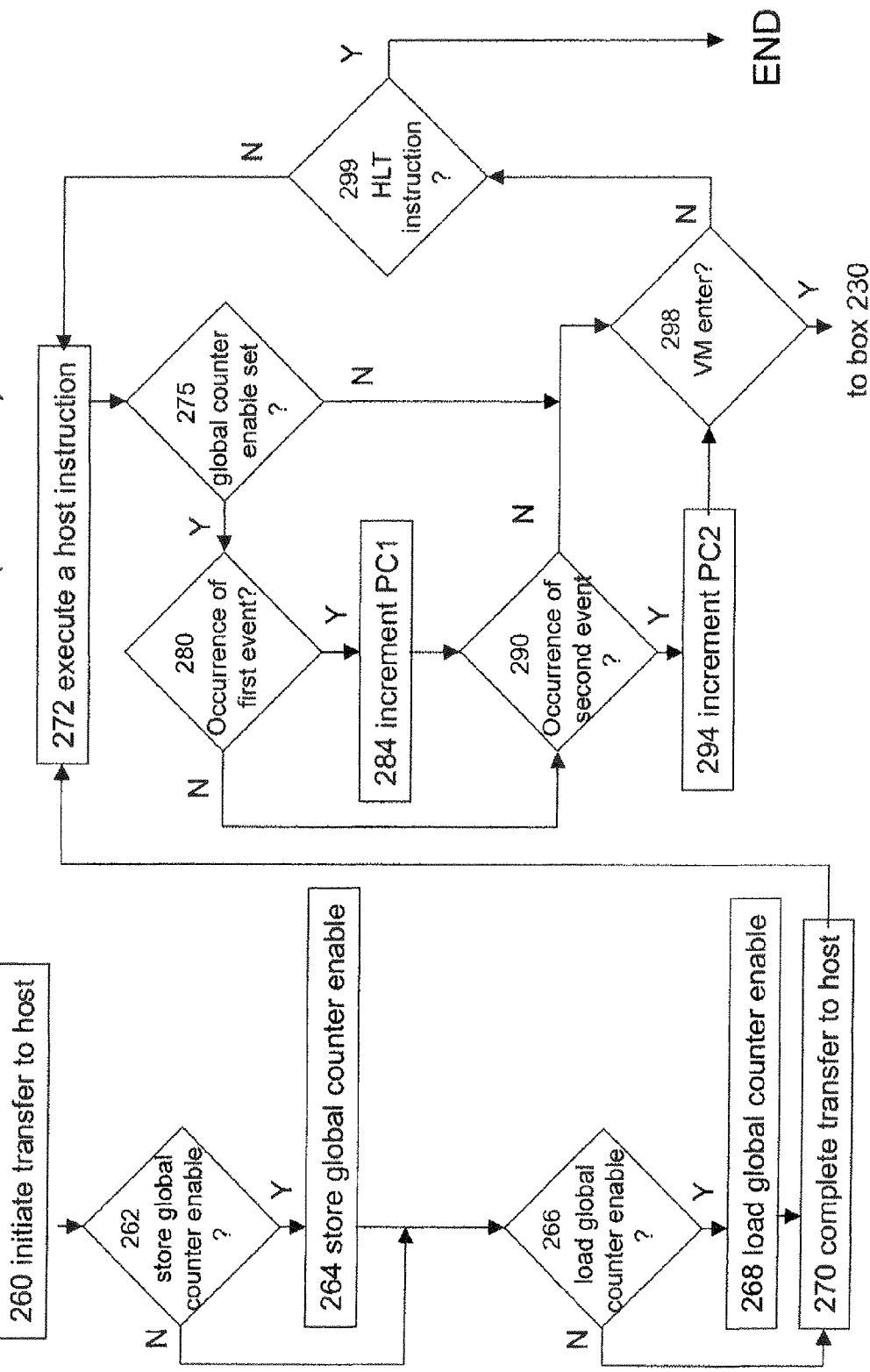

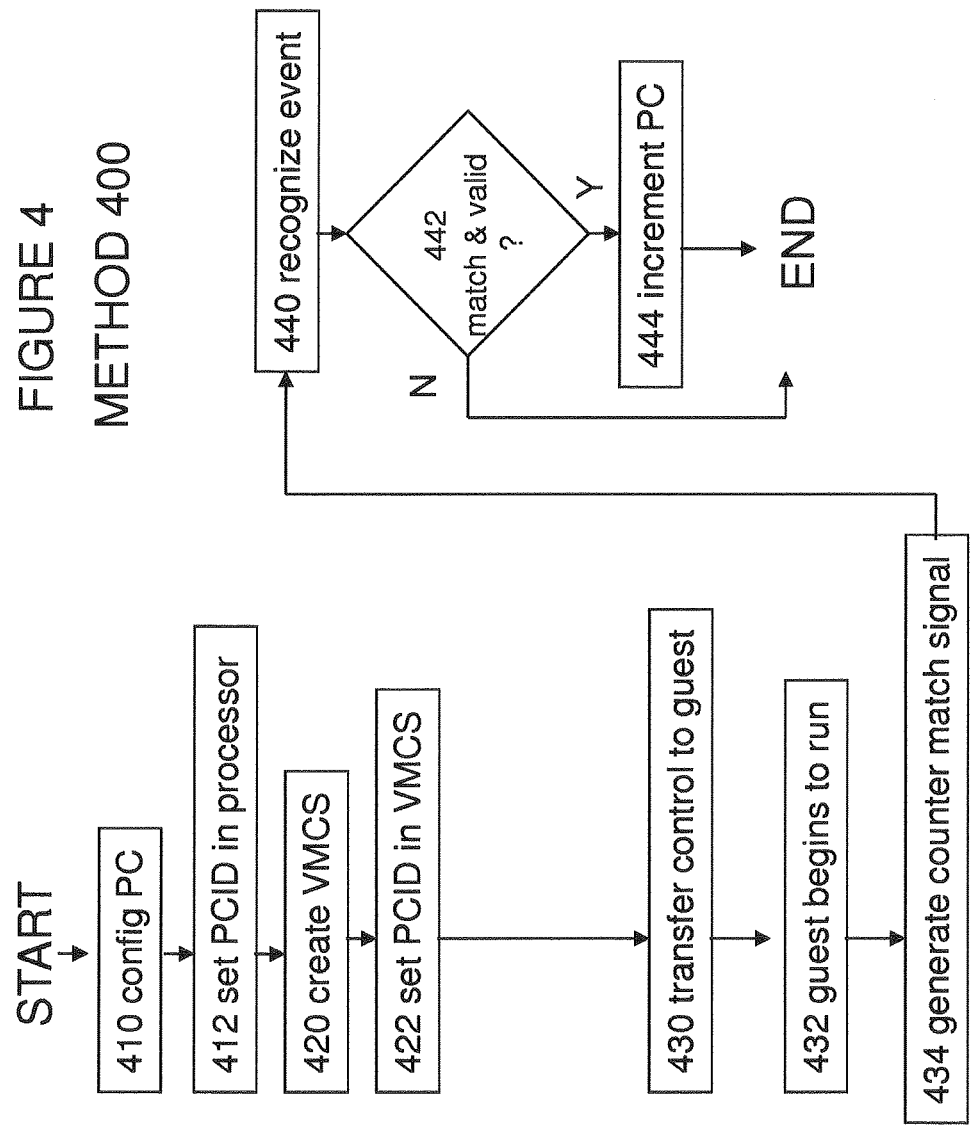

VIRTUALIZING PERFORMANCE COUNTERS

This application is a continuation of U.S. patent application Ser. No. 11/501,632 filed Aug. 8, 2006, the content of which is hereby incorporated by reference.

BACKGROUND

1. Field

The present disclosure pertains to the field of information processing, and more particularly, to the field of using performance counters in a virtualization environment.

2. Description of Related Art

Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization environment.

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, may be intercepted, i.e., cause the processor to exit the virtualization environment so that a VMM may operate, for example, to implement virtualization policies. A physical processor may also support other instructions for maintaining a virtualization environment, and may include memory or register bits that indicate or control virtualization capabilities of the physical processor.

A physical processor supporting a virtualization environment may include performance counters for logging performance monitoring information. Typically, each performance counter would be controlled by one or more control or configuration registers, or portions of a one or more control or configuration registers, associated with the counter. To virtualize these performance counters, each transition between a guest and a host or between two guests would typically require saving the state of all of the counters and their associated control registers and loading a new state for all of the counters and their associated control registers.

BRIEF DESCRIPTION OF THE FIGURES

The present invention is illustrated by way of example and not limitation in the accompanying figures.

FIG. 1 illustrates an embodiment of the present invention in a virtualization architecture.

FIG. 2 illustrates an embodiment of the present invention in a method for a virtualizing performance counters.

FIG. 4 illustrates another embodiment of the present invention in a method for a virtualizing performance counters.

DETAILED DESCRIPTION

Figure 3:
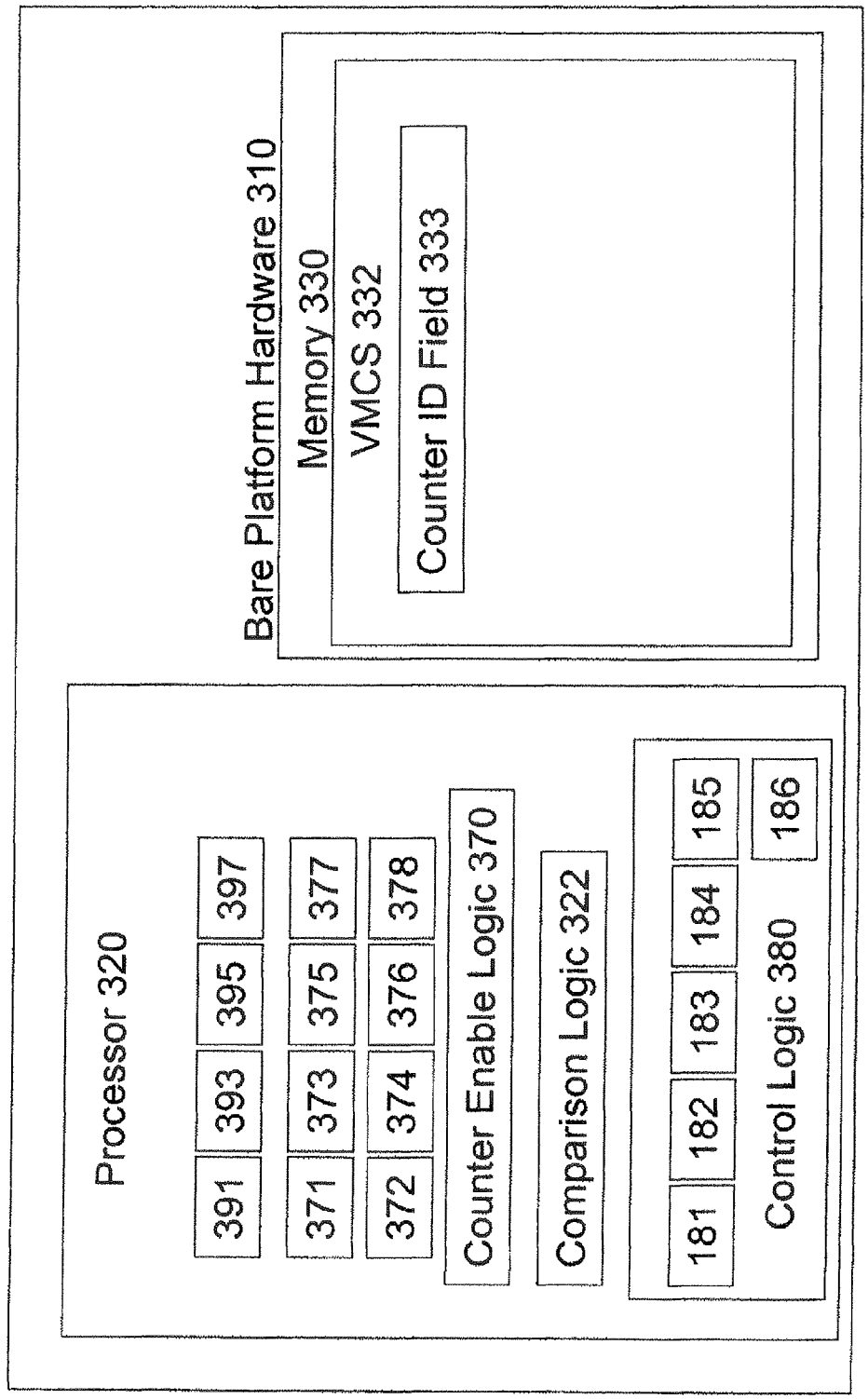
FIG. 3 illustrates another embodiment of the present inventions in a virtualization architecture.

Embodiments of apparatuses, methods, and systems for virtualizing performance counters are described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

The performance of a virtualization environment may be improved by reducing the amount of state information that must be saved and loaded on transitions between a host and a guest and between guests. Embodiments of the present invention may be used to virtualize performance counters or other counters without requiring the saving and the loading of the contents of the counters and their associated control registers. Therefore, performance may be improved over a virtualization environment in which the contents of the counters and their associated control registers are saved on transitions. Embodiments of the present invention provide for performance counters to be efficiently enabled or disabled for any number of hosts and guests, for performance counters to be assigned for the exclusive use of a host or a guest, and for performance counters to be shared between any number of hosts and/or guests.

FIG. 1 illustrates an embodiment of the present invention in virtualization architecture 100. In FIG. 1, bare platform hardware 110 may be any data processing apparatus capable of executing any OS or VMM software. For example, bare platform hardware may be that of a personal computer, mainframe computer, portable computer, handheld device, set-top box, server, or any other computing system. Bare platform hardware 110 includes processor 120 and memory 130.

Processor 120 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Although FIG. 1 shows only one such processor 120, bare platform hardware 110 may include any number of processors, including any number of multicore processors, each with any number of execution cores, and any number of multithreaded processors, each with any number of threads.

Memory 130 may be static or dynamic random access memory, semiconductor-based read-only or flash memory, magnetic or optical disk memory, any other type of medium readable by processor 120, or any combination of such mediums. Processor 120 and memory 130 may be coupled to or communicate with each other according to any known approach, such as directly or indirectly through one or more buses, point-to-point, or other wired or wireless connections. Bare platform hardware 110 may also include any number of additional devices or connections.

In addition to bare platform hardware 100, FIG. 1 illustrates VMM 140, VMs 150 and 160, guest operating systems 152 and 162, and applications 154, 155, 164, and 165.

VMM 140 may be any software, firmware, or hardware host installed on or accessible to bare platform hardware 110, to present VMs, i.e., abstractions of bare platform hardware 110, to guests, or to otherwise create VMs, manage VMs, and implement virtualization policies. In other embodiments, a host may be any VMM, hypervisor, OS, or other software, firmware, or hardware capable of controlling bare platform hardware 110. A guest may be any OS, any VMM, including another instance of VMM 140, any hypervisor, or any application or other software.

Each guest expects to access physical resources, such as processor and platform registers, memory, and input/output devices, of bare platform hardware 110, according to the architecture of the processor and the platform presented in the VM. FIG. 1 shows two VMs, 150 and 160, with guest OS 152 and guest applications 154 and 155 installed on VM 150 and guest OS 162 and guest applications 164 and 165 installed on VM 160. Although FIG. 1 shows only two VMs and two applications per VM, any number of VMs may be created, and any number of applications may run on each VM within the scope of the present invention.

A resource that can be accessed by a guest may either be classified as a "privileged" or a "non-privileged" resource. For a privileged resource, VMM 140 facilitates the functionality desired by the guest while retaining ultimate control over the resource. Non-privileged resources do not need to be controlled by VMM 140 and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "virtualization events" herein. Some of these virtualization events are referred to as "privileged events" because they must be handled by VMM 140 to ensure proper operation of VMs 150 and 160, protection of VMM 140 from guests, and protection of guests from each other.

At any given time, processor 120 may be executing instructions from VMM 140 or any guest, thus VMM 140 or the guest may be running on, or in control of, processor 120. When a privileged event occurs or a guest attempts to access a privileged resource, control may be transferred from the guest to VMM 140. The transfer of control from a guest to VMM 140 is referred to as a "VM exit" herein. After handling the event or facilitating the access to the resource appropriately, VMM 140 may return control to a guest. The transfer of control from VMM 140 to a guest is referred to as a "VM entry" herein.

In the embodiment of FIG. 1, processor 120 controls the operation of VMs 150 and 160 according to data stored in virtual machine control structure ("VMCS") 132. VMCS 132 is a structure that may contain state of a guest or guests, state of VMM 140, execution control information indicating how VMM 140 is to control operation of a guest or guests, information regarding VM exits and VM entries, and any other such information. Processor 120 reads information from VMCS 132 to determine the execution environment of a VM and constrain its behavior. In this embodiment, VMCS 132 is stored in memory 130. In some embodiments, multiple VMCSs are used to support multiple VMs. Although FIG. 1 shows VMCS 132 stored in memory 130, storing a VMCS in a memory is not required by the present invention.

Processor 120 includes counters 171, 173, 175, and 177. In this embodiment, counters 171, 173, 175, and 177 are performance counters that may be programmed by software running on processor 120 to log performance monitoring information; however, other embodiments may include any number of counters and/or any type or size of counter. For example, any of performance counters 171, 173, 175, or 177 may be programmed to increment for each occurrence of a selected event, or to increment for each clock cycle during a selected event. The events may include any of a variety of events related to execution of program code on processor 120, such as branch mispredictions, cache hits, cache misses, translation lookaside buffer hits, translation lookaside buffer misses, etc. Therefore, performance counters 171, 173, 175, and 177 may be used for tuning or profiling program code to yield the best possible performance on processor 120.

Processor 120 also includes counter control storage locations 172, 174, 176, and 178, corresponding to counters 171, 173, 175, and 177, respectively. Counter control storage locations 172, 174, 176, and 178 may be registers or any other structures of any size, or portions of one or more registers of other structures, for storing information to control or configure counters 171, 173, 175, and 177, respectively. Counter control storage locations 172, 174, 176, and 178 may be programmed to store information to control or configure counters 171, 173, 175, and 177, respectively, such as information to enable the counter, to select the event to be counted, to select the method of counting (e.g., number of occurrences or duration of event), to select conditions for counting (e.g., based on privilege level of software executing when event is detected) and to set any other control, configuration, or other variables.

In another embodiment, a global counter enable storage location may include one bit per performance counter, where each bit may be set to a logical one to set an individual counter enable indicator for a corresponding performance counter to an "enable" value. In other embodiments, a single bit or field of a global counter enable storage location may correspond to a group of any number of performance counters. In any of these embodiments, a global enable storage location may include any number of bits or fields that correspond to any number of performance counters, and may further include or be associated with one or more additional enable indicators that may be used to control any number of bits or fields that more directly control performance counters. For example, a storage location may include a field to store a "counter enable vector," which includes one bit per counter, and an additional bit within this storage location or in a storage location or data structure elsewhere in processor 120 or virtualization architecture 100 may be used to enable or disable the counter enable vector. In this way, individual counters may be individually controlled by guests according to a counter enable vector stored in a VMCS, but the default value of the additional bit may be set such that the individual counter control is automatically disabled when executing a VMM or other host software designed for a processor that does not support a counter enable vector model.

Processor 120 also includes global counter enable storage location 121, which may be one or more bits in a control register, configuration register, model specific register, or any other storage location to store a global counter enable indicator. In one embodiment, global counter enable storage location 121 may be a single bit of a programmable register, where the bit may be set to a logical one to set the global counter enable indicator to an "enable" value or a logical zero to set the global counter enable indicator to a "disable" value.

The value of the global counter enable indicator is used, along with any other relevant information stored in counter control storage locations 172, 174, 176, and 178, by counter enable logic 170 to control the operation of counters 171, 173, 175, and 177, respectively. If the global counter enable indicator is set to an "enable" value, then each counter operates according to its individual control and configuration information. For example, counter 171 may increment on a cache hit because the contents of counter control storage location 172 include an individual counter enable bit set to an "enable" value and an event select field set to count cache hits, while at the same time counter 173 may not increment because the contents of counter control storage location 174 include an individual counter enable bit set to a "disable" value. However, if the global counter enable indicator is set to a "disable" value, all counters 171, 173, 175, and 177 are disabled and do not operate according to their individual control and configuration information. For example, counter 171 would not increment on a cache hit even if the contents of counter control storage location 172 include an individual counter enable bit set to an "enable" value and an event select field set to count cache hits.

Additionally, processor 120 includes control logic 180 to support virtualization, including the virtualization of counters 171, 173, 175, and 177. Control logic 180 may be microcode, programmable logic, hard-coded logic, or any other form of control logic within processor 120. In other embodiments, control logic 180 may be implemented in any form of hardware, software, or firmware, such as a processor abstraction layer, within a processor or within any component accessible or medium readable by a processor, such as memory 130.

Control logic 180 causes processor 120 to execute method embodiments of the present invention, such as the method embodiments described below with reference to FIG. 2, for example, by causing processor 120 to include the execution of one or more micro-operations, e.g., to support virtualization, in its response to virtualization instructions or other instructions from a host or guest.

Control logic 180 includes VM entry logic 181 to transfer control of processor 120 from a host to a guest (i.e., a VM entry) and VM exit logic 182 to transfer control of processor 120 from a guest to a host (i.e., a VM exit). In some embodiments, control may also be transferred from a guest to a guest or from a host to a host. For example, in an embodiment supporting layered virtualization, software running on a VM on processor 120 may be both a guest and a host (e.g., a VMM running on a VM is a guest to the VMM that controls that VM and a host to a guest running on a VM that it controls).

Control logic 180 also includes guest state load logic 183, host state load logic 184, and guest state store logic 185. Guest state load logic 183 is to load guest state from VMCS 132 to processor 120 on a VM entry. Host state load logic 184 is to load host state from VMCS 132 to processor 120 on a VM exit. Guest state store logic 185 is to store guest state from processor 120 to VMCS 132 on a VM exit. In some embodiments control logic 180 also includes host state store logic 186 to store host state from processor 120 to VMCS 132 on a VM entry prior to guest state load logic 183 loading guest state into processor 120. In some embodiments, control logic 180 may load and store state residing in other system components, e.g., input-output devices, memory controllers.

VMCS 132 may include fields, control bits, or other data structures to support virtualization. These data structures may be checked or otherwise referred to by control logic 180 to determine how to manage a VM environment. For example, guest state load enable indicator 133 may be set to cause guest state load logic 183 to load a guest value from guest state storage location 137 into global counter enable storage location 121 in connection with a VM entry, host state load enable indicator 134 may be set to cause host state load logic 184 to load a host value from host state storage location 138 into global counter enable storage location 121 in connection with a VM exit, guest state store enable indicator 135 may be set to cause guest state store logic 185 to store the contents of global enable storage location 121 in guest state storage location 137, and host state store enable indicator 136 may be set to cause host state store logic 186 to store the contents of global enable storage location 121 host state storage location 138, all as further described below. In this description of this embodiment, these indicators are control bits that are set to enable or cause a desired effect, where set means writing a logical one to the bit, but any logic convention or nomenclature may be used within the scope of the present invention.

Using the mechanism described herein, a VMM may enable counting of events that occur only while a guest executes, only while the VMM executes or while both the VMM and a guest execute. Additionally, a VMM may, on a guest by guest basis, enable or disable performance counters as part of the transition (i.e., the VM entry or VM exit) between the guest and the VMM. This mechanism allows the VMM to "hide" its effect on the performance counters from a guest. Alternatively, this mechanism allows counting of events in the VMM for use by a guest, or in a guest for use by the VMM.

FIG. 2 illustrates an embodiment of the present invention in method 200, a method for virtualizing performance counters. Although method embodiments are not limited in this respect, reference is made to virtualization architecture 100 of FIG. 1 to describe the method embodiment of FIG. 2.

In box 210 of FIG. 2, a first performance counter is configured to count occurrences of a first event. For example, counter 171 may be configured, by programming counter control storage location 172, to count cache misses. In box 212, a second performance counter is configured to count occurrences of a second event. For example, counter 173 may be configured, by programming counter control storage location 174, to count cycles not halted. In other embodiments, the performance counters may be configured to count occurrences of any other events, e.g., translation lookaside buffer misses, branch mispredictions, etc.

In box 220 of FIG. 2, VMM 140 of FIG. 1 creates a VMCS (e.g., VMCS 132) for a VM. In boxes 222 to 226, VMM 140 configures VMCS 132 to implement support for virtualizing counters 171, 173, 175, and 177. In box 222, guest state load enable indicator 133 is set to cause guest state load logic 183 to load a guest value from guest state storage location 137 into global counter enable storage location 121 in connection with a VM entry. In box 224, host state load enable indicator 134 is set to cause host state load logic 184 to load a host value from host state storage location 138 into global counter enable storage location 121 in connection with a VM exit. In box 226, guest state store enable indicator 135 is set to cause guest state store logic 185 to store the contents of global enable storage location 121 in guest state storage location 136.

In box 230, a transfer of control of processor 120 from the host (i.e., VMM 140) to a guest is initiated. For example, the VMM may initiate a VM entry. The VM entry may include VM entry logic 181 causing processor 120 to execute operations or micro-operations to save the host state and load the guest state. In box 232, VM entry logic determines whether to load a guest value from guest state storage location 137 into global counter enable storage location 121 based on guest state load enable indicator 133. If guest state load enable indicator 133 is set, then, in box 234, guest state load logic 183 causes the guest value from guest state storage location 137 to be loaded into global counter enable storage location 121; otherwise, box 234 is not performed. In box 236, the VM entry is completed and control is transferred to the guest. In box 238, the guest begins or continues to execute.

In box 239, counter enable logic 170 determines whether the global counter enable indicator is set. If not, method 200 continues at box 258. If so, method 200 continues at box 240. In box 240, it is determined whether the first event has occurred. If so, then, in box 244, the first performance counter operates as configured, i.e., in this embodiment, where it has been configured in box 210 to count cache misses, the first performance counter increments.

In box 250, it is determined whether the second event has occurred. If so, then, in box 254, the second performance counter operates as configured, i.e., in this embodiment, where it has been configured in box 212 to count occurrences of the second event, the second performance counter increments.

In box 258, it is determined whether a virtualization event has occurred. If not, method 200 continues at box 238. If so, then, in box 260, a transfer of control of processor 120 from the guest to the host is initiated. The VM exit may include VM exit logic 182 causing processor 120 to execute operations or micro-operations to save the guest state and load the host state.

In box 262, VM exit logic determines whether to store the contents of global counter enable storage location 121 in guest state storage location 137 based on guest state store enable indicator 135. If guest state store enable indicator 135 is set, then, in box 264, guest state store logic 185 stores the contents of global counter enable storage location 121 in guest state storage location 137; otherwise, box 264 is not performed. In some embodiments, there is no guest state store enable indicator 135. In some embodiments, guest state store logic 185 always stores the contents of global counter enable storage location 121 in guest state storage location 137. In other embodiments, guest state store logic 185 never stores the contents of global counter enable storage location 121 in guest state storage location 137 as part of VM exit processing. In some embodiments, attempts by guest software to access the global counter enable storage location 121 may cause VM exits, either by software convention (e.g., the VMM is required to appropriately set controls in the VMCS to cause VM exits on access to global counter enable storage location 121) or by forcing such a VM exit by the processor.

In box 266, VM exit logic determines whether to load a host value from host state storage location 138 into global counter enable storage location 121 based on host state load enable indicator 134. If host state store enable indicator 134 is set, then, in box 268, host state load logic 184 causes the host value from host state storage location 138 to be loaded into global counter enable storage location 121; otherwise, box 268 is not performed.

In box 270, the VM exit is completed and control is transferred to the host. In box 272, the host begins or continues to execute.

In box 275, counter enable logic 170 determines whether the global counter enable indicator is set. If not, method 200 continues at box 298. If so, method 200 continues at box 280. In box 280, it is determined whether the first event has occurred. If so, then, in box 284, the first performance counter operates as configured, i.e., in this embodiment, where it has been configured in box 210 to count cache misses, the first performance counter increments.

In box 290, it is determined whether the second event has occurred. If so, then, in box 294, the second performance counter operates as configured, i.e., in this embodiment, where it has been configured in box 212 to count occurrences of the second event, the second performance counter increments.

In box 298, it is determined whether a VM entry is to occur. If so, method 200 continues at box 230. If not, method 200 continues at box 299. In box 299, it is determined whether a halt or other such instruction is to be executed. If not, method 200 continues at box 272. If so, method 200 ends.

FIG. 3 illustrates another embodiment of the invention in bare platform hardware 310, which may be used in virtualization architecture 100 or another virtualization architecture. Except as otherwise described, the description of bare platform hardware and its elements also applies to bare platform hardware 310, and its corresponding elements. Bare platform hardware 310 includes processor 320 and memory 330.

Processor 320 includes counters 371, 373, 375, and 377. Processor 320 also includes counter control storage locations 372, 374, 376, and 378, corresponding to counters 371, 373, 375, and 377, respectively, which each contain a counter valid storage location to store a counter valid indicator to enable or disable the corresponding counter, along with other control or configuration information. Additionally, processor 320 includes counter identifier storage locations 391, 393, 395, and 397, corresponding to counters 371, 373, 375, and 377, respectively. Counter identifier storage locations 391, 393, 395, and 397 may be registers or any other structures of any size, or portions of one or more registers of other structures, for storing information to identify or label counters 371, 373, 375, and 377, respectively. Counter identifier storage locations 391, 393, 395, and 397 may be programmed to store an identifier to uniquely or redundantly (i.e., two counter identifier storage locations could be programmed with the same value) identify counters 371, 373, 375, and 377, respectively.

VMCS 332 includes counter identifier field 333, which in this embodiment is the same number of bits as each of counter identifier storage location 391, 393, 395, and 397, but in other embodiments may be any number of bits. Other embodiments may include additional counter identifier fields. Counter identifier field 333 may be programmed, by the VMM that creates VMCS 332 or by any other software, to store a value that may or may not match one or more of the values stored in counter identifier storage locations 391, 393, 395, and 397.

Processor 320 also includes comparison logic 322, which may be implemented according to any known approach, to generate a counter match signal for each counter based on a comparison of the contents of a corresponding counter identifier storage location and the contents of counter identifier field 333. In this embodiment, the counter match signal for a counter is asserted if the contents of the corresponding counter identifier storage location match the contents of counter identifier field 333. In this embodiment, the counter match signal for a counter is also asserted if the contents of the corresponding counter identifier storage location equals a value of zero, regardless of the contents of counter identifier field 333, to provide for software that does not use the counter identifier feature of the present invention to operate as expected on hardware that does include the counter identifier feature. In another embodiment, the counter match logic may determine a "match" based at least in part on other factors such as the contents of other fields within the VMCS. For example, the value of various control registers such as the CRO, CR3 or CR4 registers in the Intel Architecture may be consulted. Alternatively, the counter match logic may include a determination of whether the software currently executing is the VMM or a guest, and enable the counters only if guest software is currently executing, based on one or more control bits in the VMCS.

Embodiments may include one or more "counter match enable" control bits or fields to enable or disable the counter match feature, by disabling the comparison logic or by any other desired approach. For example, if a counter match enable bit is set, then the comparison happens as described above. However, if the counter match enable bit is cleared, the counters are always enabled and no comparison is made, so that a "zero" value in a counter identifier storage location does not require the special treatment described above.

The counter match signal for each counter is used, along with any other relevant information stored in counter control storage locations 372, 374, 376, and 378, by counter enable logic 370 to control the operation of counters 371, 373, 375, and 377, respectively. If the counter match signal for a counter is asserted, then the counter operates according to its individual control and configuration information. For example, counter 371 may increment on a cache hit if the contents of counter control storage location 372 include an individual counter valid bit set to an "enable" value and an event select field set to count cache hits. However, if the counter match signal for a counter is not asserted, the counter is disabled and does not operate according to its individual control and configuration information. For example, counter 371 would not increment on a cache hit even if the contents of counter control storage location 372 include an individual counter valid bit set to an "enable" value and an event select field set to count cache hits.

Additionally, processor 320 includes control logic 380 to support virtualization, including the virtualization of counters 371, 373, 375, and 377. Control logic 380 causes processor 320 to execute method embodiments of the present invention, such as the method embodiments described below with reference to FIG. 4, for example, by causing processor 320 to include the execution of one or more micro-operations, e.g., to support virtualization, in its response to virtualization instructions or other instructions from a host or guest.

FIG. 4 illustrates an embodiment of the present invention in method 400, another method for virtualizing performance counters. Although method embodiments are not limited in this respect, reference is made to FIGS. 1 and 3 to describe the method embodiment of FIG. 4.

In box 410 of FIG. 4, a performance counter is configured to count occurrences of an event. For example, counter 371 may be configured, by programming counter control storage location 372, to count cache misses. In box 412, counter identifier storage location 391 is programmed with a desired counter identification value.

In box 420, a host creates a VMCS (e.g., VMCS 332) for a VM. In box 422, the host configures VMCS 332 to implement support for virtualizing counters 371, 373, 375, and 377, including programming counter identifier field 333 with a value equal to the counter identification value used on box 412. In this embodiment, any number of other counter identifier fields in VMCS 332 or any other VMCSes, corresponding to any number of other guests or hosts, may also be programmed with the same value to allow any number of guests or hosts to share one or more counters.

In box 430, control of processor 320 is transferred from the host to a guest. In box 432, the guest begins or continues to execute. In box 434, a counter match signal is generated based on a comparison of counter identifier storage location 391 and counter identifier field 333. In this embodiment, the counter match signal is asserted if the contents of the counter identifier storage location match the contents of the counter identifier field.

In box 440, an occurrence of the event, i.e., in this embodiment, a cache miss, is recognized. In box 442, counter enable logic 370 determines whether to increment the performance counter based on the counter match signal and the contents of the counter valid storage location in the corresponding counter control storage locations (e.g., counter control storage location 372).

If the counter match signal is asserted and the counter's counter valid indicator is set, then, in box 444, the performance counter operates as configured, i.e., in this embodiment, where it has been configured in box 410 to count cache misses, the performance counter increments. If the counter match signal is not asserted or the counter's valid indicator is not set, box 444 is not performed.

Within the scope of the present invention, the methods illustrated in FIGS. 2 and 4 may be performed in a different order, with illustrated boxes omitted, with additional boxes added, or with a combination of reordered, omitted, or additional boxes. For example, a VMCS may configure a VMCS in any order, e.g., boxes 222 to 226 may be rearranged in any order.

Processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses, methods, and systems for virtualizing performance counters have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   a memory to store a plurality of counters and a counter enable storage location to store:
   one or more counter enable bits or fields, each of which corresponds to, and is to control, one or more of the plurality of counters; and one or more additional enable indicators, each of which corresponds to, and is to control, a respective subset of the one or more counter enable bits or fields; and a processor to communicate with the memory to:
enable a counter among the plurality of counters responsive to:
a counter enable bit or field, among a first subset of the one or more counter enable bits or fields and corresponding to the counter, being configured to a respective enable value, and
an additional enable indicator, among the one or more additional enable indicators and corresponding to the first subset, being configured to a respective enable value,
disable the counter responsive to a configuration to a disable value of at least one of the counter enable bit or field or the additional enable indicator,
provide virtualization for the plurality of counters,
cause a guest value or a host value to be loaded into the counter enable storage location in connection with a transfer of control between a host and a guest, and
transfer control of the apparatus from the host to the guest if the guest value is loaded and from the guest to the host if the host value is loaded.

2. The apparatus of claim 1, wherein the processor is further to disable use of the counter by the host responsive to the guest value being in the counter enable bit or field or the additional enable indicator.

3. The apparatus of claim 1, wherein the plurality of counters comprises performance counters to log performance monitor information.

4. The apparatus of claim 1, wherein the plurality of counters comprises performance counters to count a selected event.

5. The apparatus of claim 1, wherein the selected event is selected from a branch misprediction, a cache hit, a cache miss, a translation lookaside buffer hit, and a translation lookaside buffer miss.

6. The apparatus of claim 1, wherein the processor is further to:
cause the guest value to be loaded into the counter enable storage location in connection with the transfer of control from the host to the guest; and
transfer control of the apparatus from the host to the guest.

7. The apparatus of claim 1, wherein the processor is further to:
cause the host value to be loaded into the counter enable storage location in connection with the transfer of control from the guest to the host; and
transfer control of the apparatus from the guest to the host.

8. A non-transitory computer-readable storage medium having instructions stored thereon that, when executed by a processor, cause the processor to:
enable a counter among a plurality of counters responsive to:
a counter enable bit or field, corresponding to the counter, being configured to a respective enable value, and
an additional enable indicator, corresponding to the counter enable bit or field, being configured to a respective enable value; and
disable the counter, by the processor in an apparatus, responsive to configuration to a disable value of at least one of the counter enable bit or field or the additional enable indicator;
provide virtualization for the plurality of counters;
cause a guest value or a host value to be loaded into a counter enable storage location in connection with a transfer of control between a host and a guest; and
transfer control of the apparatus from the host to the guest if the guest value is loaded and from the guest to the host if the host value is loaded.

9. The computer-readable storage medium of claim 8, wherein the instructions are further to cause the processor to disable use of the counter by the host responsive to the guest value being in the counter enable bit or field or the additional enable indicator.

10. The computer-readable storage medium of claim 8, wherein the plurality of counters comprises performance counters to log performance monitor information.

11. The computer-readable storage medium of claim 8, wherein the plurality of counters comprises performance counters to count a selected event.

12. The computer-readable storage medium of claim 11, wherein the selected event is selected from a branch misprediction, a cache hit, a cache miss, a translation lookaside buffer hit, and a translation lookaside buffer miss.

13. The computer-readable storage medium of claim 8, wherein the instructions are further to cause the processor to:
cause the guest value to be loaded into the counter enable storage location in connection with the transfer of control from the host to the guest; and
transfer control of the apparatus from the host to the guest.

14. The computer-readable storage medium of claim 8, wherein the instructions are further to cause the processor to:
cause the host value to be loaded into the counter enable storage location in connection with the transfer of control from the guest to the host; and
transfer control of the apparatus from the guest to the host.

15. A method comprising:
enabling a counter among a plurality of counters responsive to:
a counter enable bit or field, corresponding to the counter, being configured to a respective enable value, and
an additional enable indicator, corresponding to the counter enable bit or field, being configured to a respective enable value; and
disabling the counter, by a processor in an apparatus, responsive to configuration to a disable value of at least one of the counter enable bit or field or the additional enable indicator;
providing virtualization for the plurality of counters;
causing a guest value or a host value to be loaded into a counter enable storage location in connection with a transfer of control between a host and a guest; and
transferring control of the apparatus from the host to the guest if the guest value is loaded and from the guest to the host if the host value is loaded.

16. The method of claim 15, further comprising disabling use of the counter by the host responsive to the guest value being in the counter enable bit or field or the additional enable indicator.

17. The method of claim 15, wherein the plurality of counters comprises performance counters to log performance monitor information.

18. The method of claim 15, wherein the plurality of counters comprises performance counters to count a selected event, wherein the selected event is selected from a branch misprediction, a cache hit, a cache miss, a translation lookaside buffer hit, and a translation lookaside buffer miss.

19. The method of claim 15, further comprising:
causing the guest value to be loaded into the counter enable storage location in connection with the transfer of control from the host to the guest; and
transferring control of the apparatus from the host to the guest.

20. The method of claim 15, further comprising:
causing the host value to be loaded into the counter enable storage location in connection with the transfer of control from the guest to the host; and
transferring control of the apparatus from the guest to the host.

21. A processor comprising:
a plurality of counters;
counter control storage locations to store a plurality of counter enable bits or fields, wherein each of the counter enable bits or fields corresponds to one of the plurality of counters;
a global counter enable storage location to store a global counter enable indicator;
counter enable logic to:
  enable a counter among the plurality of counters in response to a respective enable value being set in:
    a counter enable bit or field, among the plurality of counter enable bits or fields and corresponding to the counter, and
    the global counter enable indicator; and
  disable the counter in response to a disable value being set in at least one of the counter enable bit or field or the global counter enable indicator; and
control logic to:
  support virtualization for the plurality of counters; and
  enable assignment of the plurality of counters for exclusive use by a host or a guest.

22. The processor of claim 21, wherein the counter control storage locations are further to store information to configure the plurality of counters to count corresponding events.

23. The processor of claim 22, wherein the corresponding events comprise one or more of a cache miss, a cache hit, a branch misprediction, a translation lookaside buffer hit, or a translation lookaside buffer miss.

24. A handheld device comprising:
a memory to store monitor software or firmware to manage an execution environment for guest software; and
a processor to communicate with the memory to:
  store a plurality of counters,
  store a plurality of counter enable bits or fields in respective counter control storage locations, wherein each of the counter enable bits or fields corresponds to one of the plurality of counters,
  store a global counter enable indicator in a global counter enable storage location,
  enable a counter among the plurality of counters in response to a respective enable value being set in:
    a counter enable bit or field, among the plurality of counter enable bits or fields and corresponding to the counter, and
    the global counter enable indicator;
  disable the counter in response to a disable value being set in at least one of the counter enable bit or field or the global counter enable indicator;
  support virtualization for the plurality of counters; and
  enable assignment of the plurality of counters for exclusive use by a host or a guest.

25. The handheld device of claim 24, wherein the processor is further to store information to configure the plurality of counters to count corresponding events.

26. The handheld device of claim 25, wherein the corresponding events comprise one or more of a cache miss, a cache hit, a branch misprediction, a translation lookaside buffer hit, or a translation lookaside buffer miss.

* * * * *